(12) United States Patent
Schoepflin et al.

(10) Patent No.: US 6,937,760 B2
(45) Date of Patent: Aug. 30, 2005

(54) INTERACTIVE FRAME SEGMENTATION WITH DYNAMIC PROGRAMMING

(75) Inventors: Todd Schoepflin, Seattle, WA (US); Yongmin Kim, Seattle, WA (US)

(73) Assignee: University of Washington, Seattle, WA (US)

( * ) Notice: Subject to any disclaimer, the term of this patent is extended or adjusted under 35 U.S.C. 154(b) by 540 days.

(21) Appl. No.: 09/751,147

(22) Filed: Dec. 28, 2000

(65) Prior Publication Data

US 2002/0085754 A1 Jul. 4, 2002

(51) Int. Cl.$^7$ .............................. G06K 9/34; G06K 9/48; G06K 9/62
(52) U.S. Cl. ...................... 382/173; 382/199; 382/215
(58) Field of Search ............................... 382/100–325; 345/418–978

(56) References Cited

U.S. PATENT DOCUMENTS 5,995,115 A * 11/1999 Dickie ........................ 345/441
6,546,117 B1 * 4/2003 Sun et al. .................... 382/103

OTHER PUBLICATIONS

J.A. Sethian, "Level Set and Fast Marching Methods", 1999, Cambridge University Press, 2nd Ed., pp. 1–10, 86–100, 221–226.*

Davi Geiger, et al., Dynamic Programming for Detecting, Tracking and Matching Deformable Contours, Mar. 1995, IEEE Transactions on Patern Analysis and Machine Intelligence, vol. 17, No. 3, pp. 294–302 includes also Errata Sheet published May 1996.*

J.A. Sethian, Level Set Methods and Fast Marching Methods, $2^{nd}$ Ed. © 1999, Cambridge University Press, pp. 80–85, 218–226.*

(Continued)

*Primary Examiner*—Amelia M. Au
*Assistant Examiner*—Wes Tucker
(74) *Attorney, Agent, or Firm*—Steven P. Koda

(57) ABSTRACT

Control points used in deriving an object boundary for a prior frame are overlaid onto a current frame. An initial estimate of an object boundary are derived from the control points and edge energy data. The operator adjusts the control points to better model the boundary for the current frame. For each updated control point, the object boundary is rederived.

A restricted area is defined encompassing the initial control points. When a control point is moved outside the restricted area, the restricted area is redefined to accommodate it. The boundary between control points is derived by finding a best path. Only points within the restricted area are considered. A first set of rules is used to find the best path when the distance between the two points is less than threshold value. A second set of rules is used when the distance between the two points exceeds the threshold value.

20 Claims, 5 Drawing Sheets

OTHER PUBLICATIONS

Ju Guo, et al., New Video Object Segmentation Technique with Color/Motion Information and Boundary Postprocessing, Mar. 1, 1999 Technical Memo, University of Southern California, EE Systems Department.*

Gonzalez et al.; "Digital Image Processing," Addison–Wesley Publishing Co. Inc.; 1992.

Mortenson et al.; "Interactive Segmentation with Intelligent Scissors," Graphic Models and Image PRocessing 60, 349–384; 1998.

Falcao et al.; User–Steered Image Segmentation Paradigms: Live Wire and Live Lane; Graphical Models and Image Processing 60, pp 233–260 (1998).

Falcao et al.; "An Ultra–Fast Usaer–Steered Image Segmentation Paradigm: Live–Wire–On–the–Fly;" Proc. of SPIE, vol 3661 pp 184–191, 1999.

Cohen et al.:Global Minimum for Active Contour Models: A Minimal Path . Approach; Int. J. Computer Vision, vol 24 pp 57–78, 1997.

Sethian, A; "A Fast Marching Level Set Method for Monotonically Advancing Fonts;" Proc. Natl. Acedemy of Science, vol. 93, 1996.

Falcao et al.; "Segmentation of 3D Objects Using Live Wire;" Proc. of SPIE, vol. 3034, pp 228–235, 1997.

Mortensen et al.; "Toboggan–based Intelligent Scissors with a Four Parameter Edge Model;" Proc. IEEE Comp Society Conf. on Computer Vision and Pattern Recognition; vol. 2, pp 452–458, 1999.

* cited by examiner

— = CURRENT FRAME OBJECT
--- = PRIOR FRAME CONTOUR
X = INPARTED CONTROL POINT
O = MOVED / ADDED CONTROL POINT

INTERACTIVE FRAME SEGMENTATION WITH DYNAMIC PROGRAMMING

CROSS REFERENCE TO RELATED APPLICATIONS

This invention is related to U.S. patent application Ser. No. 09/323,501 filed Jun. 10, 1999 naming Sun et al. titled, "Video Object Segmentation Using Active Contour Model with Global Relaxation;" and U.S. patent application Ser. No. 09/500,259 filed Feb. 8, 2000 naming Schoepflin et al. titled, "Morphological Postprocessing For Object Tracking And Segmentation." The content of all such applications are incorporated herein by reference and made a part hereof.

BACKGROUND OF THE INVENTION

This invention relates to digital graphics, and more particularly to a method and apparatus for digital image segmentation.

In composing and manipulating digital images for providing special effects in movie and video clips and for a variety of other imaging and graphics applications, image objects are identified and tracked. In movies, for example, image objects are inserted or manipulated to alter a scene in a realistic manner. Objects or regions from still frames or photographs are inserted into a sequence of frames to create a realistic image sequence.

Segmentation is a technique in which an object within an image is traced so that it may be extracted. Among the earliest segmentation methods is a manual method in which an operator manually selects points along a boundary of the object to outline the image. The points then are connected to formed a closed object. For example, straight lines have been used to connect the points. The more points selected the more accurate the outline.

An active contour based segmentation process improves on the manually selected rough approximation using an energy function. The energy function is computed based on a combination of internal forces relating to curve energy and external forces related to image gradient magnitude. The active contour minimizes the energy function to approximate the object boundary in an iterative process.

In a graph searching dynamic programming method, object boundary template points are manually entered. Remaining boundary points then are computer generated using a stage-wise optimal cost function.

Advances in computing technology and algorithm efficiency has enabled so-called 'live-wire' segmentation processes that obey the principle of minimal user interaction. In particular these processes allow the user to view the segmented object boundary as they move a selected boundary point. Herein further advances are described to enhance the accuracy and effectiveness of initial object boundary segmentation

SUMMARY OF THE INVENTION

Object segmentation is performed in an interactive manner. Initially, an operator views an image frame and selects control points along the boundary of an image object desired to be segmented for extraction or manipulation. The control points are connected to derive the boundary for the object segmentation process.

According to the invention, for a subsequent image frame the control points from the prior frame are imported. An edge energy image is derived for the subsequent frame. An object boundary then is derived based upon the imported control points and the edge energy image. The operator then moves, adds or deletes a control point(s), as desired. Alternatively, the operator can start anew and select a new set of control points.

The control points are connected to define a boundary for object segmentation within the current image frame. Moving or adding control points is done as desired to improve the accuracy of the boundary. The control points used for the current image frame after adjustment by the operator are referred to as an updated set of control points.

According to one aspect of the invention, a restricted area is defined relative to the imported control points of the prior frame. For example, in one embodiment the boundary derived from the prior frame is imported. A band is defined encompassing imported boundary and control points. The band corresponds to the restricted area. When deriving the boundary for the current frame (i.e., connecting the control points in the updated set of control points), the path between any two control points is to occur entirely within the restricted area. More specifically, only points within the restricted area are considered when deriving a best path.

According to another aspect of the invention, when an operator adds or moves a control point outside the restricted area, the restricted area is redefined to accommodate an area about such control point, so that such control point resides within the redefined restricted area. In one embodiment the restricted area is expanded using morphological dilations. In another embodiment the restricted area is expanded to encompass the entire image. In yet another embodiment the restricted area is expanded only in the area between the added/moved control point and the two nearest control points to which it is to connect.

A dynamic programming scheme is used to connect the control points. According to another aspect of the invention, given two control points, the rules for the dynamic programming vary according to the distance between the two control points. If two given control points are separated by a distance which is less than a threshold distance, then one set of dynamic programming rules are implemented to derive a best path between the control points. If two given control points are separated by more than the threshold distance, then another set of dynamic programming rules are implemented to derive a best path between the control points. Different programming rules may be used for deriving a path between different pairs of control points. Regardless of the set of rules used, only pixels within the restricted area are considered when selecting a best path.

An advantage of the invention is that by only considering pixels within the restricted area, processing time to achieve a best path is reduced. Another advantage is that the use of different sets of rules according to the distance between points allows for a more accurate segmentation. Specifically, one set of rules which are highly effective for connecting two points close together can be used for connecting close points. Another set of rules which are highly effective for points farther apart can be used for connecting points farther apart.

These and other aspects and advantages of the invention will be better understood by reference to the following detailed description taken in conjunction with the accompanying drawings.

DESCRIPTION OF SPECIFIC EMBODIMENTS

Exemplary Processing Environment

Figure 1:
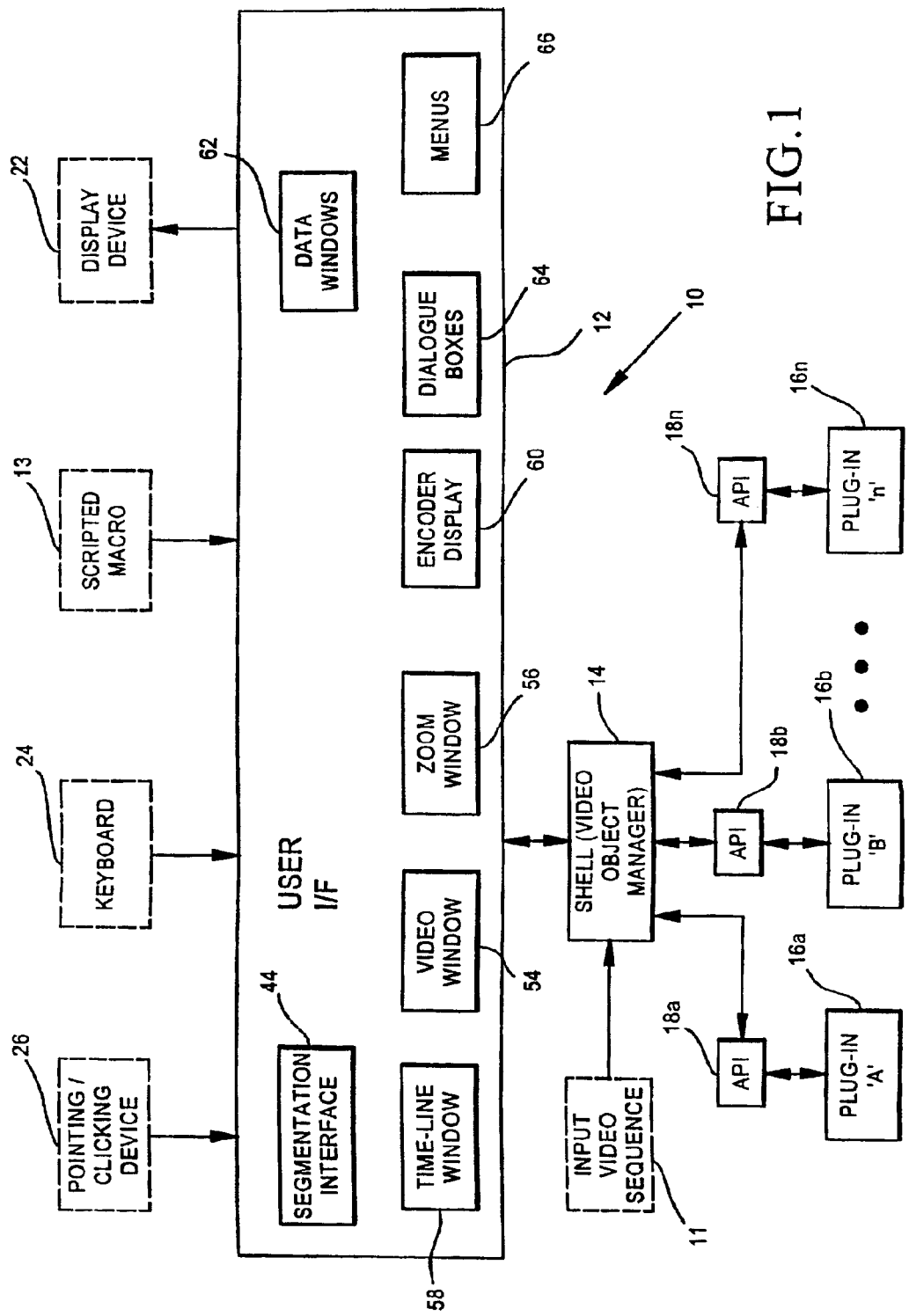
FIG. 1 is a block diagram of an interactive processing environment for tracking video objects among a sequence of video frames.

FIG. 1 shows a block diagram of an exemplary host interactive processing environment 10 for locating, tracking and encoding video objects. The processing environment 10 includes a user interface 12, a shell environment 14 and a plurality of functional software 'plug-in' programs 16. The user interface receives and distributes operator inputs from various input sources, such as a point and clicking device 26 (e.g., mouse, touch pad, track ball), a key entry device 24 (e.g., a keyboard), or a prerecorded scripted macro 13. The user interface 12 also controls formatting outputs to a display device 22. The shell environment 14 controls interaction between plug-ins 16 and the user interface 12. An input video sequence 11 is input to the shell environment 14. Various plug-in programs 16a–16n may process all or a portion of the video sequence 11. One benefit of the shell 14 is to insulate the plug-in programs from the various formats of potential video sequence inputs. Each plug-in program interfaces to the shell through an application program interface ('API') module 18.

Figure 2:
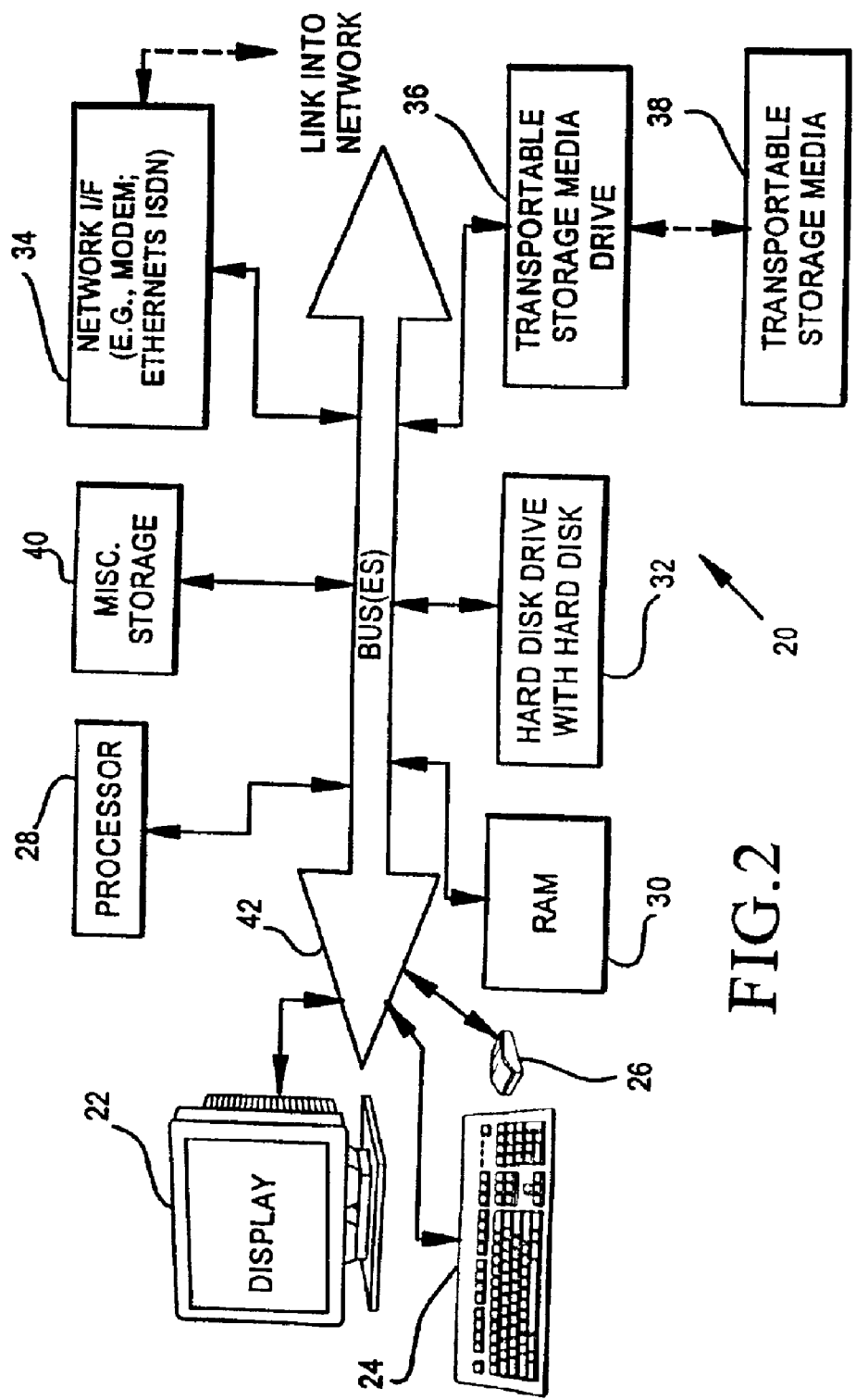
FIG. 2 is a block diagram of an exemplary host computing system for the interactive processing environment of FIG. 1.

In one embodiment the interactive processing environment 10 is implemented on a programmed digital computer of the type which is well known in the art, an example of which is shown in FIG. 2. A computer system 20 has a display 22, a key entry device 24, a pointing/clicking device 26, a processor 28, and random access memory (RAM) 30. In addition there commonly is a communication or network interface 34 (e.g., modem; ethernet adapter), a non-volatile storage device such as a hard disk drive 32 and a transportable storage media drive 36 which reads transportable storage media 38. Other miscellaneous storage devices 40, such as a floppy disk drive, CD-ROM drive, zip drive, bernoulli drive or other magnetic, optical or other storage media, may be included. The various components interface and exchange data and commands through one or more buses 42. The computer system 20 receives information by entry through the key entry device 24, pointing/clicking device 26, the network interface 34 or another input device or input port. The computer system 20 may be any of the types well known in the art, such as a mainframe computer, minicomputer, or microcomputer and may serve as a network server computer, a networked client computer or a stand alone computer. The computer system 20 may even be configured as a workstation, personal computer, or a reduced-feature network terminal device.

In another embodiment the interactive processing environment 10 is implemented in an embedded system. The embedded system includes similar digital processing devices and peripherals as the programmed digital computer described above. In addition, there are one or more input devices or output devices for a specific implementation, such as image capturing.

Software code for implementing the user interface 12 and shell environment 14, including computer executable instructions and computer readable data are stored on a digital processor readable storage media, such as embedded memory, RAM, ROM, a hard disk, an optical disk, a floppy disk, a magneto-optical disk, an electro-optical disk, or another known or to be implemented transportable or non-transportable processor readable storage media. Similarly, each one of the plug-ins 16 and the corresponding API 18, including digital processor executable instructions and processor readable data are stored on a processor readable storage media, such as embedded memory, RAM, ROM, a hard disk, an optical disk, a floppy disk, a magneto-optical disk, an electrooptical disk, or another known or to be implemented transportable or non-transportable processor readable storage media. The plug-ins 16 (with the corresponding API 18) may be bundled individually on separate storage media or together on a common storage medium. Further, none, one or more of the plug-ins 16 and the corresponding API's 18 may be bundled with the user interface 12 and shell environment 14. Further, the various software programs and plug-ins may be distributed or executed electronically over a network, such as a global computer network.

Under various computing models, the software programs making up the processing environment 10 are installed at an end user computer or accessed remotely. For stand alone computing models, the executable instructions and data may be loaded into volatile or non-volatile memory accessible to the stand alone computer. For non-resident computer models, the executable instructions and data may be processed locally or at a remote computer with outputs routed to the local computer and operator inputs received from the local computer. One skilled in the art will appreciate the many computing configurations that may be implemented. For non-resident computing models, the software programs may be stored locally or at a server computer on a public or private, local or wide area network, or even on a global computer network. The executable instructions may be run either at the end user computer or at the server computer with the data being displayed at the end user's display device.

Shell Environment and User Interface

The shell environment 14 allows an operator to work in an interactive environment to develop, test or use various video processing and enhancement tools. In particular, plug-ins for video object segmentation, video object tracking and video encoding (e.g., compression) are supported in a preferred embodiment. The interactive environment 10 with the shell 14 provides a useful environment for creating video content, such as MPEG-4 video content or content for another video format. A pull-down menu or a pop up window is implemented allowing an operator to select a plug-in to process one or more video frames.

In a specific embodiment the shell 14 includes a video object manager. A plug-in program 16, such as a segmentation program accesses a frame of video data, along with a set of user inputs through the shell environment 14. A segmentation plug-in program identifies a video object within a video frame. The video object data is routed to the shell 14 which stores the data within the video object manager module. Such video object data then can be accessed by the same or another plug-in 16, such as a tracking program. The tracking program identifies the video object in subsequent video frames. Data identifying the video object in each frame is routed to the video object manager module. In effect video object data is extracted for each video frame in which the video object is tracked. When an operator completes all video object extraction, editing or filtering of a video sequence, an encoder plug-in 16 may be activated to encode the finalized video sequence into a desired format. Using such a plug-in architecture, the segmentation and tracking plug-ins do not need to interface to the encoder plug-in. Further, such plug-ins do not need to support reading of several video file formats or create video output formats. The shell handles video input compatibility issues, while the user interface handles display formatting issues. The encoder plug-in handles creating a run-time video sequence.

For a Microsoft Windows operating system environment, the plug-ins 16 are compiled as dynamic link libraries. At processing environment 10 run time, the shell 14 scans a predefined directory for plug-in programs. When present, a plug-in program name is added to a list which is displayed in a window or menu for user selection. When an operator selects to run a plug-in 16, the corresponding dynamic link library is loaded into memory and a processor begins executing instructions from one of a set of pre-defined entry points for the plug-in. To access a video sequence and video object segmentations, a plug-in uses a set of callback functions. A plug-in interfaces to the shell program 14 through a corresponding application program interface module 18.

In addition, there is a segmentation interface 44 portion of the user interface 12 which is supported by a segmentation plug-in. The segmentation interface 44 makes calls to a segmentation plug-in to support operator selected segmentation commands (e.g., to execute a segmentation plug-in, configure a segmentation plug-in, or perform a boundary selection/edit).

The API's 18 typically allow the corresponding plug-in to access specific data structures on a linked need-to-access basis only. For example, an API serves to fetch a frame of video data, retrieve video object data from the video object manager, or store video object data with the video object manager. The separation of plug-ins and the interfacing through API's allows the plug-ins to be written in differing program languages and under differing programming environments than those used to create the user interface 12 and shell 14. In one embodiment the user interface 12 and shell 14 are written in C++. The plug-ins can be written in any language, such as the C programming language.

In a specific embodiment each plug-in 16 is executed in a separate processing thread. As a result, the user interface 12 may display a dialog box that plug-ins can use to display progress, and from which a user can make a selection to stop or pause the plug-in's execution.

Referring again to FIG. 1, the user interface 12 includes the segmentation interface 44 and various display windows 54–62, dialogue boxes 64, menus 66 and button bars 68, along with supporting software code for formatting and maintaining such displays. In a preferred embodiment the user interface is defined by a main window within which a user selects one or more subordinate windows, each of which may be concurrently active at a given time. The subordinate windows may be opened or closed, moved and resized.

In a preferred embodiment there are several subordinate windows 52, including a video window 54, a zoom window 56, a time-line window 58, one or more encoder display windows 60, and one or more data windows 62. The video window 54 displays a video frame or a sequence of frames.

For viewing a sequence of frames, the frames may be stepped, viewed in real time, viewed in slow motion or viewed in accelerated time. Included are input controls accessible to the operator by pointing and clicking, or by predefined key sequences. There are stop, pause, play, back, forward, step and other VCR-like controls for controlling the video presentation in the video window 54. In some embodiments there are scaling and scrolling controls also for the video window 54.

The zoom window 56 displays a zoom view of a portion of the video window 54 at a substantially larger magnification than the video window. The time-line window 58 includes an incremental time-line of video frames, along with zero or more thumb nail views of select video frames. The time line window 58 also includes a respective time-line for each video object defined for the input video sequence 11. A video object is defined by outlining the object.

The data window 62 includes user-input fields for an object title, translucent mask color, encoding target bit rate, search range and other parameters for use in defining and encoding the corresponding video object.

During encoding one of the encoder windows 60 is displayed. For example, an encoder progress window shows the encoding status for each defined video object in the input video sequence 11.

Object Segmentation Scenario

Figure 3:
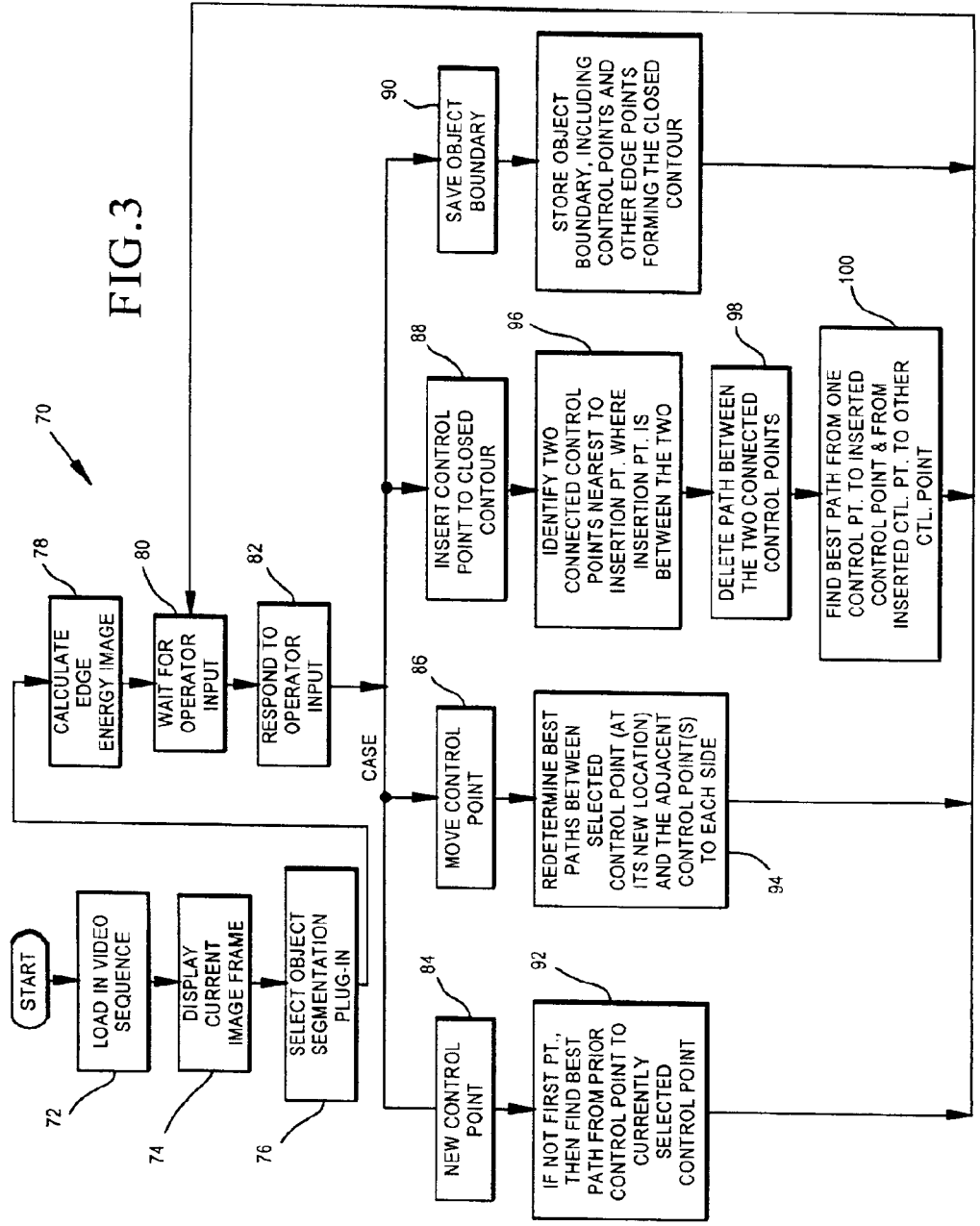
FIG. 3 is a flow chart of a scenario for segmenting an image object according to an embodiment of this invention.

To extract or track an object within a digital image, the first step typically is to define a template to use which corresponds to the object. FIG. 3 is a flow chart 70 for segmenting a video object. In one embodiment an operator loads in an input video sequence at step 72. The operator views a current digital image frame at step 74. At step 76 the operator decides to perform an object segmentation on a desired image object within the image frame. At step 78 an edge energy image is derived for the current image. The edge energy image is used for finding edges within the image frame. Such edges are used for estimating the object boundary. In some embodiments the edge energy image is derived within the object segmentation plug-in, In other embodiments it is derived prior to selecting the object segmentation plug-in and is available to the object segmentation plug-in.

To segment a desired object the operator selects a set of control points along the boundary of the object. This is performed by a sequence of operator inputs. For example, the operator, viewing the image, clicks on points along the desired boundary of the object to be segmented. Accordingly, at step 80, the program waits for an operator input. At step 82 the program responds to the operator input. The operator inputs enable several functions, including, but are not limited to adding a new control point to an open contour (step 84), moving a control point (step 86), inserting a control point within a closed contour (step 88), saving the object boundary (step 90), and exiting the plug-in.

In an expected scenario, the operator visually identifies the object to be segmented, then proceeds to select control points (step 84) along the edge of the desired object. For example, the operator clicks on an edge of the object to define a control point. This defines the first control point. The operator then selects an adjacent control point. In a "live wire" embodiment a path is displayed among control points as the control points are moved. Specifically, at step 92, the best path between the prior control point and the current control point is derived and displayed. A contour is formed by the control points. The operator closes the contour by connecting a latest control point to another control point—typically the first control point. The result is a closed contour which defines the boundary of the object.

The operator may move control points or add control points as desired to change the contour and improve the accuracy of the object boundary. For example, the operator clicks on a control point and drags the control point to a new location, (step 86). In a closed contour, each control point is connected to two control points—one to each side. At step 94, the best paths involving the moved control point are rederived. The best path between the moved control point and one of the control points to which it is connected, and the best path between the moved control point and the other control point to which it is connected.

The operator may decide to insert a control point between two control points (step 88). At step 96, two control points nearest to the insertion point are identified. The path between such two nearest control points then is deleted at step 98 and replaced with two path segments at step 100. One path segment from one of the two nearest control points to the inserted control point and another path from the inserted control point to the other of the two nearest control points.

When the operator is satisfied with the closed contour which defines the object boundary the operator saves the object boundary (step 90). The object boundary is stored in memory, including the set of control points and the other edge points forming the boundary. Such object boundary is stored in memory and accessible to other plug-ins. Also, such control points are accessible as a starting point for another image frame, (e.g., the next image frame or any other image frame as desired by the operator).

The final set of control points in a given frame serves as an initial set of control points for the next frame to be processed. Such next frame may be the succeeding image frame in the video sequence, or the next frame to be sampled in the video sequence, or any other frame, either in sequence or out of sequence, which is the next frame to be processed. According to such approach the initial set of control points is typically changing for each frame to be processed.

Figure 4:
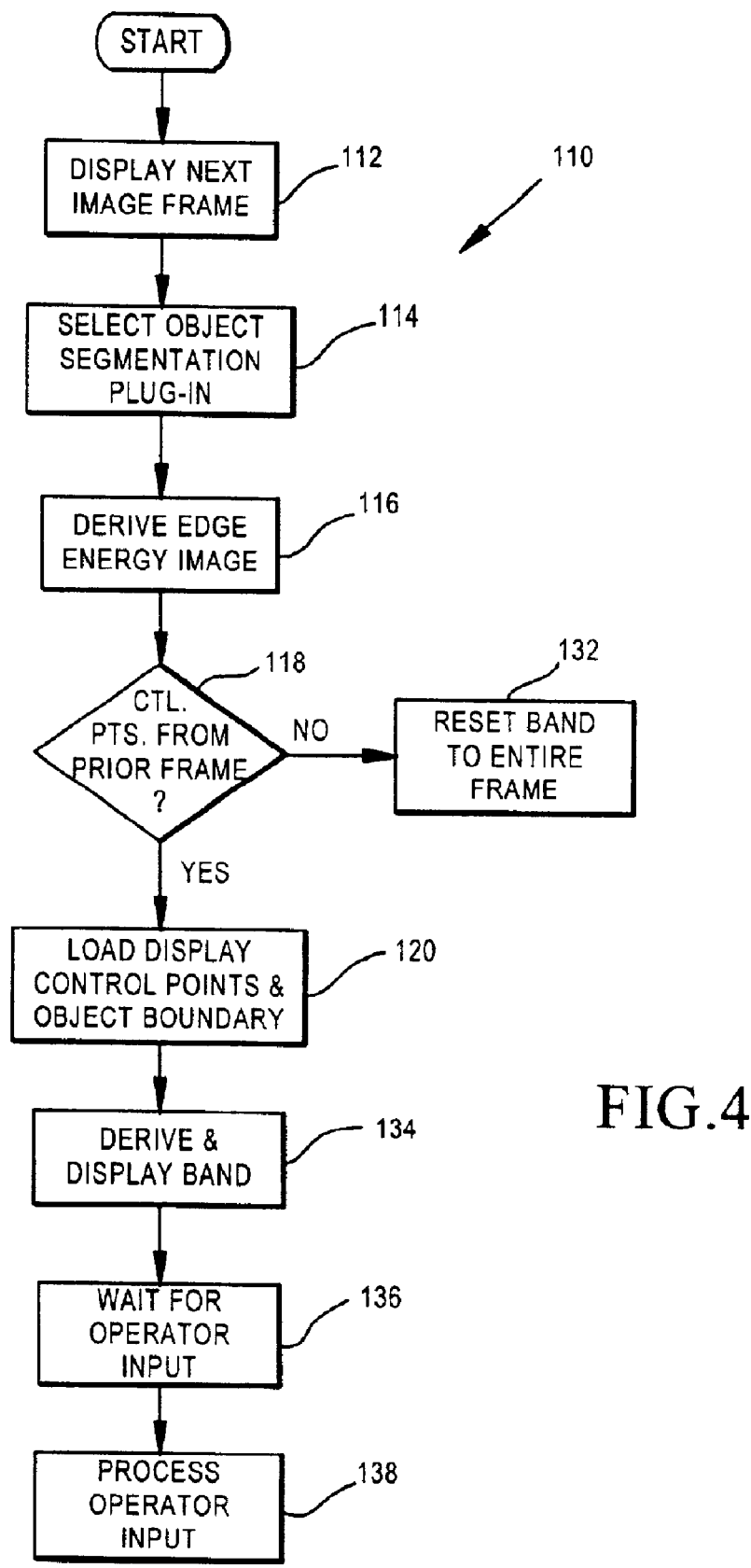
FIG. 4 is a flow chart of a scenario for segmenting an image object based on imported control points from a prior image frame according to an embodiment of this invention.

Referring to FIG. 4, flow chart 110 shows a scenario for segmenting an object in a subsequent image frame. At step 112 the next image frame is displayed as the current image frame. The operator selects the object segmentation plug-in at step 114. The edge energy image is derived at step 116. At step 118, a test is performed to determine whether there are control points from a previous frame. If yes, then such control points are loaded and displayed at step 120. An initial object boundary is derived and displayed. The boundary is derived from the imported control points and the derived edge energy image using the dynamic programming rules described below in the section Finding a Best Path.

Figure 5:
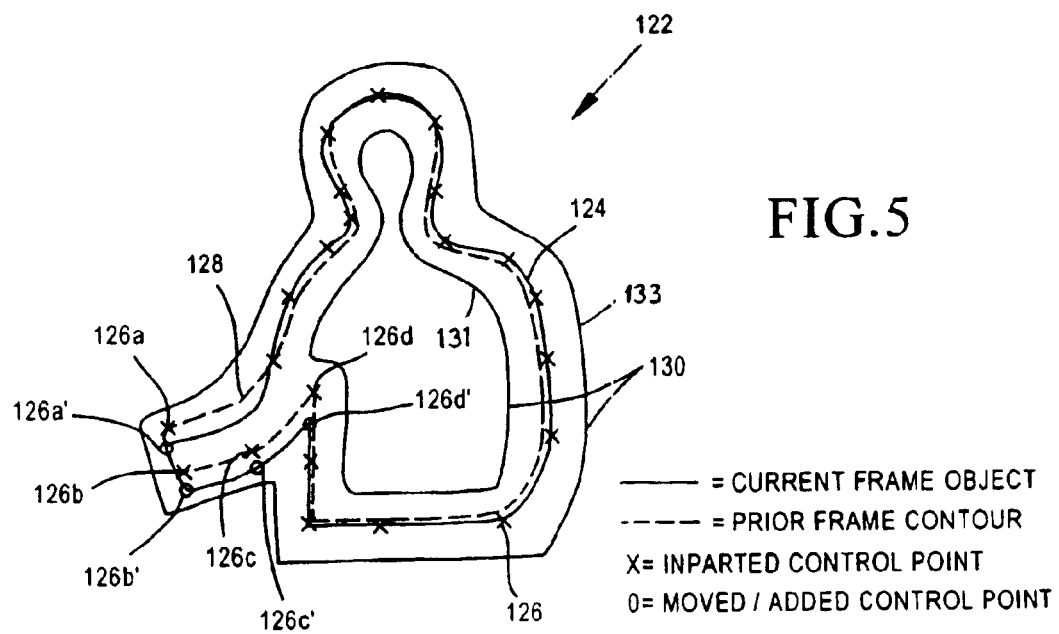
FIG. 5 is an illustration of an image object with an overlaid contour and control points from a prior image frame, along with a band formed about the overlaid contour.
Figure 6:
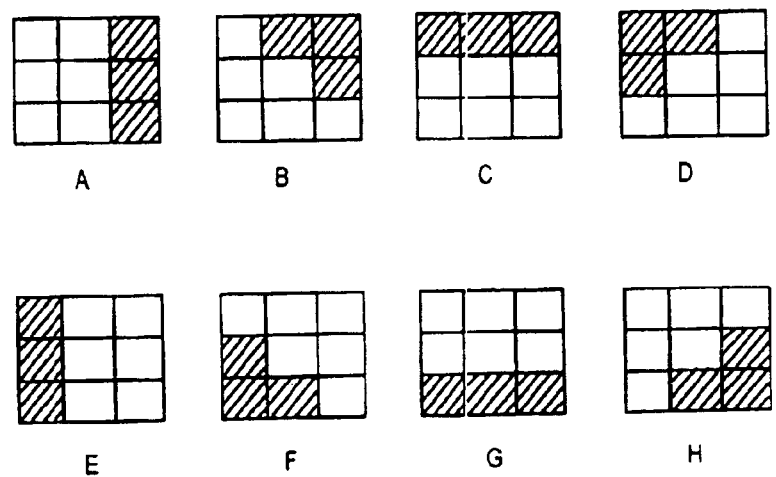
FIGS. 6A–6H are masks used in selecting pixels along a path for connecting control points according to an embodiment of this invention.

The object boundary derived for the current image frame is limited to a restricted area, (i.e., the range of pixels within the image which may qualify as boundary points is limited). The restricted area is defined based upon the imported control points. Specifically the restricted area corresponds to a band derived from the boundary, including the imported control points, of the prior frame. Pixel points outside such band are not eligible to be part of the contour defining the object boundary. Points within the band are referred to as 'alive.' Points not within the band are referred to as 'not alive.' Referring to FIG. 5 a display frame 122 includes an object 124. The purpose of the segmentation method is to identify a boundary of such object so that the object can be manipulated, extracted, or tracked. The control points 126 and prior boundary are imported from the prior image frame. An initial object boundary 128 is estimated for the object 124 using the control points 126 and the edge energy image.

When deriving such estimated boundary 128 the pixels eligible to be part of the boundary 128 are limited to those within the band 130. This band defines the restricted area.

The operator moves one or more of these control points 126 to better estimate the object boundary for the current image frame. Also, the operator may insert a control point or delete a control point. In this example control points 126*a*–*d* are moved to become control points 126*a'*, 126*b'*, 126*c'* and 126*d'*, respectively. The result is an improved object boundary estimate.

Each time the operator move or adds a control point a best path is computed involving the moved, added and adjacent control points. Also when a control point is deleted the best path between the control points adjacent to the deleted control point is derived. When deriving such best paths, the connecting path is limited to the area of the band 130. The band 130 is the area between the curves 131, 133. The band is displayed to the operator in some embodiments and is not displayed in other embodiments. When the operator is satisfied with the results, the object boundary is the final object boundary for that image frame, and the set of control points is the updated set of control points for that image frame.

Referring again to FIG. 4, if there are no control points identified at step 118, then the band is reset at step 132 to correspond to the entire image frame. If there are control points, at step 118, then the band 130 is derived and displayed at step 134. Various methods may be used to derive the band 130. In one embodiment, the imported boundary from the prior frame is used. In another embodiment a polygonal contour is formed by the set of imported control points. The imported boundary or derived polygonal contour is morphologically dilated, (e.g., using a square kernel, although another type of kernel may be used) to form the band 130.

At step 136 the program waits for an operator input. At step 138, the program processes an operator input. The operator inputs are processed in the same manner as previously described for FIG. 3. However, the steps (i.e., 92, 94, 100) which involve deriving a best path between control points include logic for choosing only among pixels within the band 130.

In some cases, the operator moves or inserts a control point at a location outside the band 130. In such case, the band is redefined to accommodate the new location. In one embodiment, the restricted area becomes the entire image. In effect there no longer is a restricted area for the current contour derivation. In another embodiment the band is expanded to the new location and beyond using a morphological dilation process, (e.g., a 3×3 square element kernel). In still another embodiment, the band is expanded in a local region of the band between two or more control points nearest the inserted control point. In each embodiment the band, and thus the restricted area, is expanded to allow the operator to place a new or moved control point where desired. In various embodiments the newly defined band includes the area of the original band and is expanded. In another embodiment the band moves, rather than expands, so that a portion which was part of the original band is no longer part of the adjusted band.

Note that the restricted region preferably is for restricting the range of pixels eligible to be on the contour (boundary) between control points. Preferably, it is not for the purpose of restricting eligible control points. In a preferred embodiment the band is not updated when a control point is moved or inserted within the band.

Finding the Best Path

The object boundary derived for a current frame is formed by a closed contour which connects a set of control points. An initial set of control points is imported when available and updated by the operator, such as by moving, inserting or deleting control points. The final, saved object boundary is formed by the updated set of control points.

The closed contour includes a set of path segments from one control point to the next control point for all control points in the initial or updated set of control points. Dynamic programming rules are used for deriving the best path between any two control points. According to an aspect of this invention, the set of rules used to find the best path vary depending on the distance between the two control points. Prior to connecting two control points, a function is executed to estimate a distance between the points. If the distance is less than a threshold distance, then one set of dynamic programming rules are implemented to derive a best path for connecting the two points. If the distance exceeds the threshold distance, then another set of dynamic programming rules are implemented to derive the best path. Many methods may be used to derive the distance. In an exemplary embodiment the euclidean distance is calculated without taking the square root, (i.e., $(x2-x1)^2+(y2-y1)^2$). Because distance is being used for comparative purposes, leaving out the square root operation provides a fast effective manner of comparing distances.

In a preferred embodiment, when the distance is less than the threshold distance, a Tenuchi algorithm is implemented to determine the path. Given two points, $p_1$, $p_2$, the path lengths from $p_1$ to $p_2$, and from $p_2$ to $p_1$, are derived. The path with the shorter length is selected as the best path. The path is traversed using a forward-marching approach. In this implementation the band 130 (and the updated band where applicable) are defined by a range mask. Following is an exemplary implementation:

a. set $p_1=p_2$
b. calculate the angle $\theta=\arctan[(y_2-y_1)/(x_2-x_1)]$
c. round $\theta$ to the nearest multiple of 45°
d. examine the neighboring edge energy image values as specified by the directional masks in FIGS. 6A–6H (i.e., the orientations for 0°, 45°, 90°, . . . , 315°)
e. find the non-forbidden pixel $p_{i+1}$ with the minimum cost (where the edge energy image values are the negative edge energy gradient magnitudes of the current image frame). (The range mask, derived from the band 130 as updated, defines whether a pixel is forbidden).
f. set the ancestor of $p_{i+1}$ to $p_i$ in a chain code image
g. set pixel $p_i$ as being forbidden in the range mask, (so path does not cross over itself)
h. set i=i+1
i. If $p_1=p_2$ or i>number of image pixels in the band, then Stop Else repeat steps b–i When instead, the distance exceeds the threshold distance, a quick segmentation algorithm based on an outward-marching approach is implemented according to a preferred embodiment to determine the best path. The path from point $p_1$ to $p_2$ which has the minimal cost is the best path. In determining points along the path, only adjacent pixels are considered for a 'next point'. Specifically, the next pixel along a path between the points $p_1$ and $p_2$ is chosen to minimize: $\omega L_j+P_j$, where $\omega$ is the regularization factor, $L_j$ is the current path length, $P_j$ is the image potential at the current point, and the current point, pj, lies on the path between $p_1$ and $p_2$. The general concept is to march outward from point $p_1$ exploring the image in an ordered fashion until reaching point $p_2$ for the first time. The exploration proceeds according to a rule which considers only adjacent pixels, tempered by the distance penalty (regularization) imposed by the term, $\omega L$. Once point $p_2$ is reached the path is extracted by tracing backwards to $p_1$ using a chain-coded image, (a method of encoding a single-pixel path in an image by storing a next pixel, for example, as a value of 1–8). The chain-coded image is updated on each iteration as the algorithm explores the image, marching outward from $p_1$. In one embodiment the algorithm is implemented in a 'minheap' data structure for a 'trial' list. This data structure noticeably accelerates user interaction.

When using an inverted edge energy gradient magnitude image from a wavelet decomposition process as the cost function, the regularization factor may range between 20 and 250. Lower values allow low energy valleys to be traversed for a longer distance, whereas larger values impose a higher distance penalty, producing straighter lines. Although in the best mode embodiment a 4-connectivity rule is used, in other embodiments 8-connectivity may be used. The 4-connectivity approach works better for traversing highly-curved object contours.

Following is an implementation of the quick segmentation algorithm:
Initialization:
a. For each point in the grid, let image values $D_{i,j}=\infty$(large positive value), where D stands for "distance"
b. Let $P_{ij}$ represent the values in the potential energy image
c. In a third image, label all points as "far"
d. For the start point $p_1$, set $D_{p1}=0$ and label $p_1$ as "trial"
Marching Outward Loop:
a. Let $(i_{min}, j_{min})$ be the "trial" point with the smallest value of $D_{i,j}+P_{i,j}$
b. Label $(i_{min}, j_{min})$ as "done" and remove it from the "trial" list
c. For each of the 4-neighbors (k, l) of $(i_{min}, j_{min})$:
If $k=i_{min}$ and $1=j_{min}$, then stop
Else if (k,l) is labeled "far", then label it "trial"
If (k,l) is not alive:
set $D_{k,l}=[D_{imin,jmin}+\omega]$ in the distance image,
In one embodiment, the range mask is derived as follows:
a. Fill the range mask with zeros
b. Retrieve the coordinates of the edge points of the imported object boundary
c. For each edge point
Set point in mask corresponding to each edge point to all 1's Morphologically dilate the mask, (e.g., for each pixel around the edge point within the kernel (i.e., square kernel), set point in mask to all 1's, (based on embodiment where all points started out as 0's except those on which the contour lies).

Meritorious and Advantageous Effects

According to an advantage of this invention, an accurate boundary of an object is tracked for objects which deform or include rapidly moving sub-portions. The ability to track a wide variety of object shapes and differing object deformation patterns is particularly beneficial for use with MPEG-4 image processing systems.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for segmenting an object within a current digital image frame, comprising the steps of:
   receiving a set of control points used in deriving an object boundary from a prior image frame, wherein the received set of control points serves as an initial set of control points for the current digital image frame;

defining a restricted area within the current digital image frame based on the received set of control points, wherein the restricted area corresponds to a band about the object boundary;

updating the initial set of control points to an updated set of control points in response to an operator command;

deriving a current frame object boundary as a closed contour connecting each control point of the updated set of control points, wherein only image data within the restricted area are eligible to form the closed contour, wherein the step of deriving comprises for each one control point of the updated set of control points deriving a path from said each one control point to an adjacent control point, wherein the step of deriving a path comprises:

determining a distance from said one control point to said adjacent control point;

when said distance is less than a threshold distance applying a first set of rules for deriving the path from said one control point to the adjacent control point, wherein the step of applying the first set of rules for deriving the path comprises applying a forward marching approach for determining the path, wherein said path occurs entirely within the restricted area; and when said distance is greater than the threshold distance applying a second set of rules, different from the first set of rules, for deriving the path from said one control point to the adjacent control point, wherein the step of applying the second set of rules for deriving the path comprises applying an outward marching approach, wherein said path occurs entirely within the restricted area;

wherein said derived closed contour serves as a current frame object boundary.

2. The method of claim 1, wherein the step of updating comprises updating the initial set of control points to an updated Set of control points in response to an operator command to perform either one of moving a control point or adding a control point.

3. The method of claim 2, further comprising the step of:

when the operator command either one of moves or adds a select control point outside the restricted area, redefining the restricted area to encompass the select control point.

4. The method of claim 1, further comprising, prior to the step of updating, the steps of:

deriving edge energy data for the current image frame; and deriving and displaying an initial estimate of the current-frame object boundary based on the received set of control points and the derived edge energy data.

5. The method of claim 4, wherein the current digital image frame is displayed and the initial estimate of the current-frame object boundary is overlaid onto the current digital image frame with the initial set of control points frame, wherein the step of updating the initial set of control points comprises selecting a control point of the initial set of control points with a pointing device and dragging the selected control point to a new location.

6. The method of claim 5, further comprising the steps of:

testing the new location of the selected control point to determine whether the selected control point is outside the restricted area;

when the new location of the selected control point is outside the restricted area, redefining the restricted area to encompass the selected control point in the new location.

7. The method of claim 5, wherein the step of defining the current-frame object boundary comprises deriving a path from the selected control point to a first adjacent control point and deriving a path from the selected control point to a second adjacent control point.

8. The method of claim 1, wherein the first set of rules provide a more accurate path than the second set of rules for connecting control points which are less than the threshold distance apart.

9. The method of claim 1, wherein the second set of rules provide a more accurate path than the first set of rules for connecting control points which are more than the threshold distance apart.

10. The method of claim 1, wherein the step of defining the restricted area, comprises morphologically dilating a Contour connecting the received set of control points.

11. The method of claim 1, further comprising the step of receiving an object boundary estimate of a prior digital image frame and wherein the step of defining the restricted area, comprises defining the restricted area within the current digital image frame from the received object boundary estimate, including the received set of control points.

12. An apparatus for segmenting an object within a current digital image frame, comprising:

means for overlaying a set of control points used in deriving an object boundary from a prior image frame, wherein the overlaid set of control points serves as an initial set of control points for the current digital image frame;

a first processor which derives a restricted area within the current digital image frame based on the initial set of control points, wherein the restricted area corresponds to a band encompassing the initial set of control points;

means for changing the initial set of control points, the changed set of control points being an updated set of control points, wherein a selected control point among the updated set of control points is either one of a control point added to the initial set of control points or is a control point from the initial set of control points which is relocated;

a second processor which generates a current-frame object boundary for said object of the current digital image frame using the updated set of control points by deriving a closed contour connecting each control point of the updated set of control points, wherein only image data within the restricted area are eligible to form the closed contour;

wherein the second processor comprises means for deriving a path from the selected control point to a first adjacent control point and deriving a path from the selected control point to a second adjacent control point, wherein the deriving means comprises:

means for determining a distance from said selected control point to said first adjacent control point;

when said distance is less than a threshold distance applying a first set of rules for deriving the path from said selected control point to the first adjacent control point; and when said distance is greater than the threshold distance applying a second set of rules, different from the first set of rules, for deriving the path from said selected control point to the first adjacent control point;

wherein said deriving means comprises means for applying a forward marching approach to determine the path and means for applying an outward marching approach to determine the path, wherein said path occurs entirely within the restricted area, wherein said forward marching applying means is active when applying the first set of rules for deriving the path, and wherein said outward marching applying means is active when applying the second set of rules for deriving the path.

13. The apparatus of claim 12, wherein in response to the operator either moving or adding a select control point outside the restricted area with the input device, said first processor redefines the restricted area to encompass the select control point.

14. The apparatus of claim 12, wherein the first processor comprises means for testing the new location of the selected control point to determine whether the selected control point is outside the restricted area, the first processor redefining the restricted area to encompass the selected control point in the new location when the new location of the selected control point is outside the restricted area.

15. The apparatus of claim 12, wherein the first set of rules provide a more accurate path, than the second set of rules, for connecting control points which are less than the threshold distance apart.

16. The apparatus of claim 12, wherein the second set of rules provide a more accurate path, than the first set of rules, for connecting control points which are more than the threshold distance apart.

17. The apparatus of claim 12, wherein the first processor comprises means for morphologically dilating a contour formed by the initial set of control points to define the restricted area.

18. The apparatus of claim 17, wherein said contour is an object boundary estimate from a prior digital image frame that includes the initial set of control points.

19. The apparatus of claim 12, wherein the first processor and the second processor are a common processor.

20. The apparatus of claim 12, further comprising:

means for deriving edge energy data for the current digital image frame;

means for deriving an initial estimate of the current-frame object boundary based on the received set of control points and the derived edge energy data, wherein said initial estimate of the current-frame object boundary is overlaid onto the current digital image frame.

* * * * *